United States Patent [19]

Mizokawa et al.

[11] Patent Number: 4,488,837
[45] Date of Patent: Dec. 18, 1984

[54] METHOD FOR MEASURING INTEGRATED WEIGHT OF PARTICULATE FEED MATERIAL

[75] Inventors: Takumi Mizokawa; Fumitaka Suzuki, both of Kobe, Japan

[73] Assignee: Kabushiki Kaisha Kobe Seiko Sho, Kobe, Japan

[21] Appl. No.: 410,555

[22] Filed: Aug. 23, 1982

[30] Foreign Application Priority Data

Jul. 14, 1981 [JP] Japan ................................. 56-110600

[51] Int. Cl.$^3$ ............................................. B65G 53/66
[52] U.S. Cl. ........................................ 406/34; 406/23; 222/77; 177/16
[58] Field of Search ................ 406/34; 406/32, 23–25, 406/122, 124, 134, 136; 222/52, 55, 56, 58, 77; 177/16

[56] References Cited

U.S. PATENT DOCUMENTS 4,345,858 8/1982 Barlow .................................. 406/34

FOREIGN PATENT DOCUMENTS 52321 5/1981 Japan ..................................... 406/93
1315386 5/1973 United Kingdom ................... 406/25

Primary Examiner—Jeffrey V. Nase
Assistant Examiner—Daniel R. Edelbrock
Attorney, Agent, or Firm—Oblon, Fisher, Spivak, McClelland & Maier

[57] ABSTRACT

Measurement of an integrated weight of a particulate material being continuously fed to a powder treating system or the like by providing a powder delivery port in a lower portion of a pressurized powder feed container for supplying the particulate material to a blowing port of the treating system, connecting a pressurized powder replenishing container to an upper portion of the powder feed container for replenishing the power feed container with the particulate material under pressure, continuously feeding the particulate material along with part of a pressurized carrier gas introduced into the delivery port of the pressurized powder feed container, communicating the powder replenishing and feed containers with each other with suitable timing for replenishing the particulate material, sequentially measuring the weights of powder contents in the containers to measure the integrated weight of the particulate material fed through the delivery port during a time period of operation; batchwise combining the weight of each powder replenishment from the replenishing container to the feed container to obtain the total weight of powder replenishment, subtracting the sum of the weights of momentary powder contents of the containers from the total weight of powder replenishment when the measurement is made in concurrence with a replenishing operation, and subtracting the weight of momentary powder content of the pressurized powder feed container from the total weight of powder replenishment when measurement is made at a time point falling outside the timer period for a replenishing operation.

3 Claims, 1 Drawing Figure

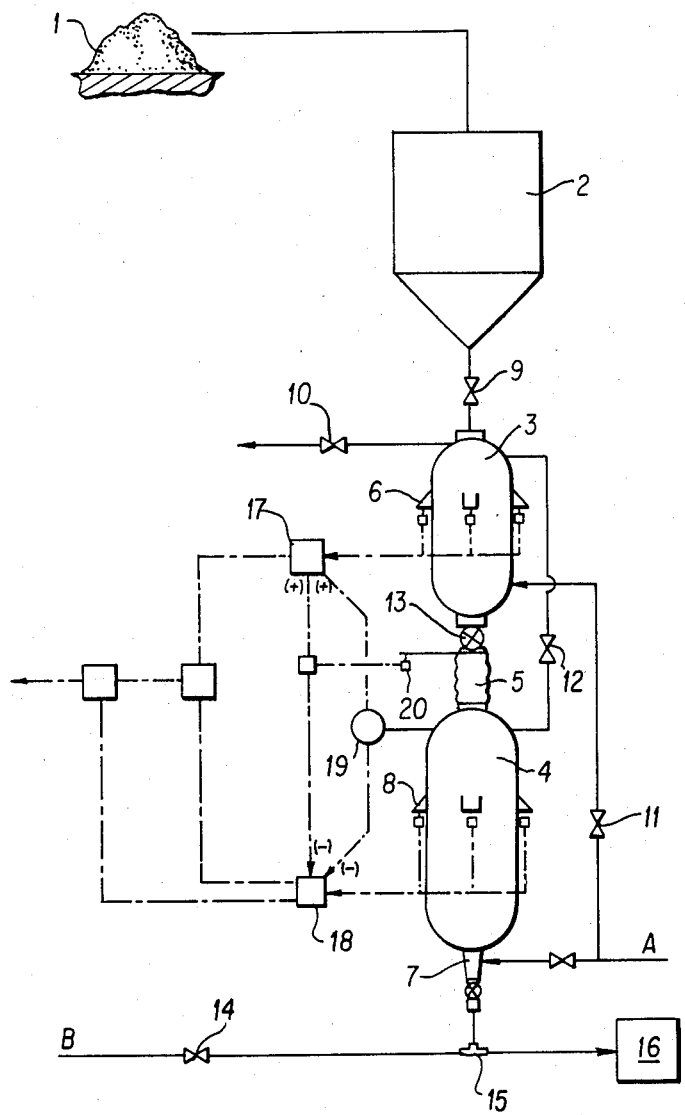

METHOD FOR MEASURING INTEGRATED WEIGHT OF PARTICULATE FEED MATERIAL

BACKGROUND OF THE INVENTION

1. Field of the Invention

This invention relates to a method for measuring an integrated weight of a particulate material in a given prior period of time while the particulate material is being continuously fed to a powder treating system or the like.

2. Description of the Prior Art

There are known in the art various feed mechanisms for particulate or powdery materials (hereinafter referred to simply as "powder" for brevity), of which the systems utilizing fluid pressure have a number of advantages over gravitational or mechanical feed systems, including a longer transfer distance of the particulate material and a continuous quantitative feed capability. A powder transfer over a long distance, however, gives rise to large pressure losses in the feed line, necessitating feeding the material under an extremely high pressure especially in a case where a high pressure operation is intended at the end of the feed line, under a pressure in excess of the pressure on the receiving side in consideration of the pressure losses. In such a case, it becomes necessary to raise the pressure of the carrier gas source and to increase the internal pressure of the powder feed container which delivers the particulate material, in addition to the necessity of providing a powder replenishing container for replenishing the particulate material to the powder feed container and desirably a container for holding a stock of the particulate material for supply to the replenishing container. The particulate material is thus fed successively from the stock container to the replenishing container (hereinafter referred to as "stock feed"), from the replenishing container to the feed container (hereinafter referred to as "powder replenishment") and from the feed container to a powder treating system (hereinafter referred to as "powder feed"). Moreover, it is the general practice to feed the stock powder under ambient pressure while intermittently pressurizing the replenishing container, said container continuously feeding powder under pressure, each time replenishment of the feed container occurs so that a relatively complicated pressure control process is involved in the transfer of the particulate material. However, there has been known no method or means for accurately measuring the weight of the particulate feed material flowing along the aforementioned routes such as, for example, a method for accurately measuring the total weight of a particulate material which was fed in a given prior period of time, making it difficult to improve the accuracy of operation control on the side of the powder treating system.

SUMMARY OF THE INVENTION

With the foregoing situations in view, the present invention has as its object the provision of a method for measuring at an arbitrary time point the total weight of a particulate material which has been fed in a given prior period of time.

According to the present invention, this object is achieved by a method which includes the steps of providing a powder delivery port in a lower portion of a powder feed container maintained under pressure for supplying a particulate material to a powder blowing port of a powder treating system; connecting to an upper portion of the powder feed container a powder replenishing container for replenishing the powder feed container with fresh particulate material; continuously discharging the particulate material from the powder feed container by entrainment in a pressurized carrier gas introduced into the powder delivering port; communicating the powder replenishing and feed containers with each other for a suitable time period for replenishing the particulate material; and sequentially measuring the weights of powder contents in the respective containers to measure the integrated weight of the particulate material fed through the powder delivery port during the time period of operation; the method being characterized by the steps of batchwise combining the weight of each powder replenishment from the replenishing container to the powder feed container to obtain the total weight of powder replenishment; subtracting the sum of weights of momentary powder contents in the respective containers from the total weight of replenishment when the measurement takes place concurrently with the replenishing operation; and subtracting the weight of the momentary powder content in the powder feed container from the total weight of replenishment when the measurement takes place at a point in time outside the time period for a replenishing operation to obtain an integrated weight of the feed of the particulate material in a given time period.

The above and other objects, features and advantages of the present invention will become apparent from the following description and appended claims, taken in conjunction with the accompanying drawing which shows by way of example a preferred embodiment of the invention.

BRIEF DESCRIPTION OF THE DRAWING

In the accompanying drawing the sole FIGURE is a diagrammatic illustration of a typical powder control system incorporating the method of the present invention.

DETAILED DESCRIPTION OF THE PREFERRED EMBODIMENT

The method of the invention and its effects are hereafter described more particularly by way of a powder control system shown in the drawing.

For example, the fine coal which is obtained by pulverization of coal 1 is stored in a stock container 2 under atmospheric pressure, and fed to a replenishing container 3 by opening a valve 9 when the latter becomes empty of short on powder content. On such an occasion, the valve 10 is opened while closing the valves 11 and 12, with the replenishing container 3 being opened to atmosphere. On the other hand, the powder feed container 4 which holds the particulate material is pressurized by a carrier gas which is introduced thereinto in the direction of arrow A (the carrier gas being preferred to be $N_2$ gas or an inert gas like rare gas in the case of fine coal). However, as the valve at the powder delivery port 7 is constantly open, the powder particles drop in a pressurized state toward a tee joint 15 at the junction. Although the powder in the container 4 is held under pressure, it is kept from being consolidated by the agitating action of the carrier gas which is blown in from a lower portion of the container 4. Therefore, the powder which is in the lower portion of the container 4 falls, entrained in part of the blown carrier gas. On the other hand, the blown gas flow in the direction of arrow B, which is controlled by a valve 14, is mixed with the falling powder particles and carrier gas at the tee joint 15 and blown into a powder treating system 16. In the situation where the powder treating system has a plurality of tuyeres like a blast furnace, there may be provided a distributor downstream of the powder delivery port 7 or alternatively a plurality of delivery ports 7 in the lower portion of the feed container 4 (corresponding to a similar number a tuyeres or groups of tuyeres), connecting the respective delivery ports by separate tee joints 15 to provide powder blowing lines which are completely independent of each other and easily controllable separately in consideration of the differences in pressure loss resulting from the differences in length of the blow lines to the respective tuyeres and the bent portions contained therein.

It is necessary to make preparations for powder replenishment from the container 3 before the powder feed container 4 becomes short of the particulate material as a result of the continuous feed. Namely, the particulate material which is received by the replenishing container 3 under atmospheric pressure has to be pressurized to a level proximate to the internal pressure of the container 4, increasing the pressure of the container 3 by opening the valve 11 with the valves 9, 10 and 12 in closed state. Upon detection of a diminution of the particulate material in the container 4 beyond a predetermined amount, the valve 13 is opened to start replenishment while continuously feeding the particulate material through the delivery port 7 whereupon, there occurs a pressure drop and a pressure increase in the containers 3 and 4, respectively, so that the valve 12 is opened to equalize the pressures in the two containers. As soon as the powder replenishment is finished, the valves 11, 12 and 13 are closed, and the valve 10 is slowly opened to release the pressure of the container 3 for equalization with atmospheric pressure, followed by opening of the valve 9 to refill the particulate material from the container 2.

Therefore, if it is desired to measure the integrated weight of the particulate feed material in a given prior period of time, as intended by the present invention, a rough value can be obtained by summing the amounts needed for replenishment from the container 3 to the container 4. However, more elaborate calculations are required to measure the integrated weight of the powder feed in a shorter time period or between arbitrary time points. In addition, frequent powder replenishment becomes necessary depending upon the capacities of the containers 3 and 4 and the feed rate of the particulate material, taking a relatively long length of time for each replenishing operation. Therefore, the desired time points of measurement may often overlap for a period of the replenishing operation. Even on such occasions, the measurement should give an exact value in order to achieve the object of the present invention, by resorting to the procedures as described hereinafter.

The replenishing container 3 and feed container 4 are connected with each other through an expansion joint 5 and supported through load detecting means such as load cells 6 and 8, respectively. Since the weights of the containers 3 and 4 including valves and other attached elements can be determined, the weights of the particulate material in the containers 3 and 4 are obtained by subtracting the known weights from the values read by the load cells 6 and 8. The resulting values may be employed directly but it is desirable to add the following corrections for enhancing the accuracy of measurement. Firstly, as the powder feed container 4 is constantly maintained under pressure, it is necessary to make corrections in consideration of the load of the pressure and the reaction of the replenishing container. For this purpose, the reading of a pressure gauge 19 is supplied to weight computing sections 17 and 18 to make a corresponding correction toward the positive (+) end for the powder weight in the container 3 and toward the negative (−) end for the powder weight in the container 4. Further, the containers 3 and 4 are connected with each other through a flexible joint 5 so that the readings of the load cells 6 and 8 are biased by the spring reactions which act on the containers 3 and 4 due to vibrations occurring during the replenishing operation. To make corrections in this regard, the reactions resulting from contraction and expansion of the joint 5 are measured by a strain gauge 20 or the like, sending a signal of positive compensation (+) to the weight computing section 17 and a signal of negative compensation (−) to the weight computing section 18. The resulting signals are converted into electric current signals, of which:

(1) The sum of the weights of momentary powder contents in containers 3 and 4 is considered as the weight of currently available powder supply in the case of a measurement concurring with replenishing operation from the container 3 to 4; and (2) The weight of the momentary powder content in the container 4 is regarded as the weight of currently available powder supply in the case of a measurement not concurring the replenishing operation.

Therefore, in order to determine at a given time point the total weight of powder supply since the start of operation, the weight of the aforementioned currently available powder supply at that time point is substracted from the total weight of replenishments from the container 3 to 4. Namely, according to the present invention, the weight of available powder supply to be subtracted is varied depending upon whether or not the time point of measurement falls in a period of replenishment, thereby permitting accurate measurement at an arbitrary time point irrespective of the replenishing operation. However, it is recommended not to make the measurement or the above-mentioned calculations in the initial stage of the replenishment (normally until a lapse of 10–15 seconds) from the container 3 to 4, in which the reading of the load cell 8 fluctuates due to the impact of the falling particulate material and therefore substantial errors occur in the measured values. The total weight of replenishments in the past period of operation can be obtained by batchwise summing the weight of each replenishment, namely, by integrating the weight of particulate material as received under atmospheric pressure after subtraction of the weight of residual powder in the replenishing container at the end of the replenishing operation.

Thus, the total weight of powder supply from the very start of operation can be obtained by the foregoing calculations. For example, if the total weight of powder supply is found to be Wa at a time point a and to be Wb 30 minutes or 1 hour later at a time point b, the weight of the powder supply during the time interval of measurement (during the time of b-a) is expressed by $$W_b - W_a$$

Namely, according to the present invention, it has become possible to accurately measure the integrated weight of powder feed from the starting point of the operation. Consequently, if the measurement is effected at predetermined time points or at suitable time intervals, an exact weight of powder feed between two selected time points can be obtained by calculating the difference between the integrated weights at such points in time.

It will be appreciated from the foregoing description that the method of the present invention always ensures correct measurement of the weight of powder feed in a prior time period irrespective of the timing of measurement.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for measuring an integrated weight of a particulate material being continuously fed to a powder treating system or the like by utilizing a pressurized carrier gas and providing a powder delivery port in a lower portion of a pressurized powder feed container for supplying said particulate material into a blowing port of said treating system, which comprises:

connecting a pressurized powder replenishing container to an upper portion of said powder feed container for replenishing said powder feed container with said particulate material under pressure;

continuously feeding the particulate material along with part of said pressurized carrier gas introduced into said delivery port of said pressurized powder feed container;

communicating said powder replenishing and feed containers with each other with suitable timing for replenishing said particulate material;

sequentially measuring the weights of powder contents in said containers to measure the integrated weight of the particulate material fed through said delivery port during a time period of operation;

batchwise combining the weight of each powder replenishment from said replenishing container to said feed container to obtain the total weight of powder replenishment;

subtracting the sum of the weights of momentary powder contents of said containers from said total weight of powder replenishment when the measurement is made in concurrence with a replenishing operation; and subtracting the weight of momentary powder content of said powder feed container from said total weight of powder replenishment when the measurement is made at a point in time falling outside the time period for replenishing operation.

2. A method as set forth in claim 1, utilizing load detecting means and which further comprises connecting said pressurized powder replenishing and feed containers with each other by an expansible joint and supporting said containers in position respectively by said load detecting means to detect the weights of powder contents in the respective containers with compensation for variations attributable to the pressurization of said feed container and displacement of said expansible joint.

3. A method as set forth in claim 1, which further comprises reserving the measurement in the initial stage of a replenishing operation from said replenishing container to said feed container until the reading of the weight of powder content in said pressurized feed container is relatively stable.

* * * * *